Nov. 10, 1964    L. L. DRAGOO ETAL    3,156,289
TIRE CHANGING MACHINE

Filed May 11, 1962    3 Sheets-Sheet 1

Leland L. Dragoo
Paul W. Goebel
INVENTORS

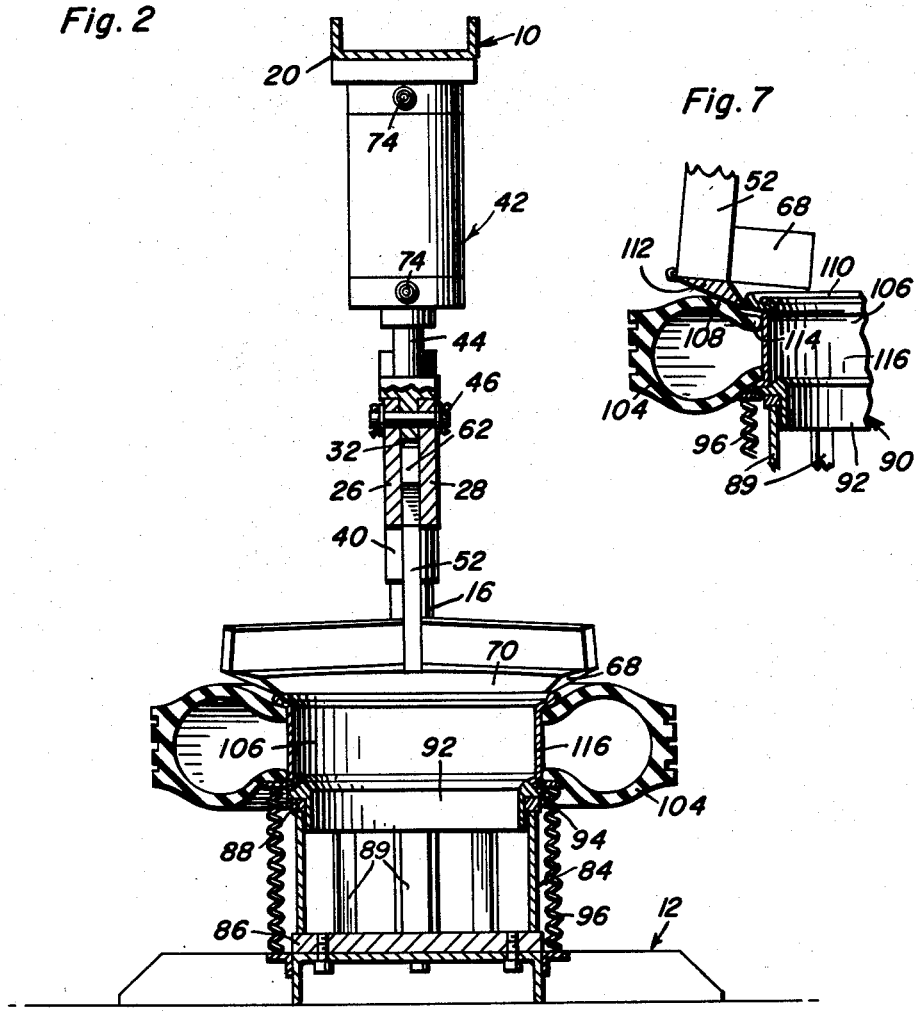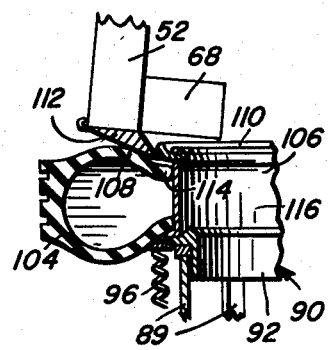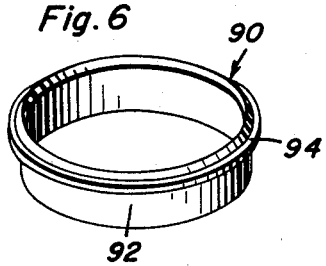

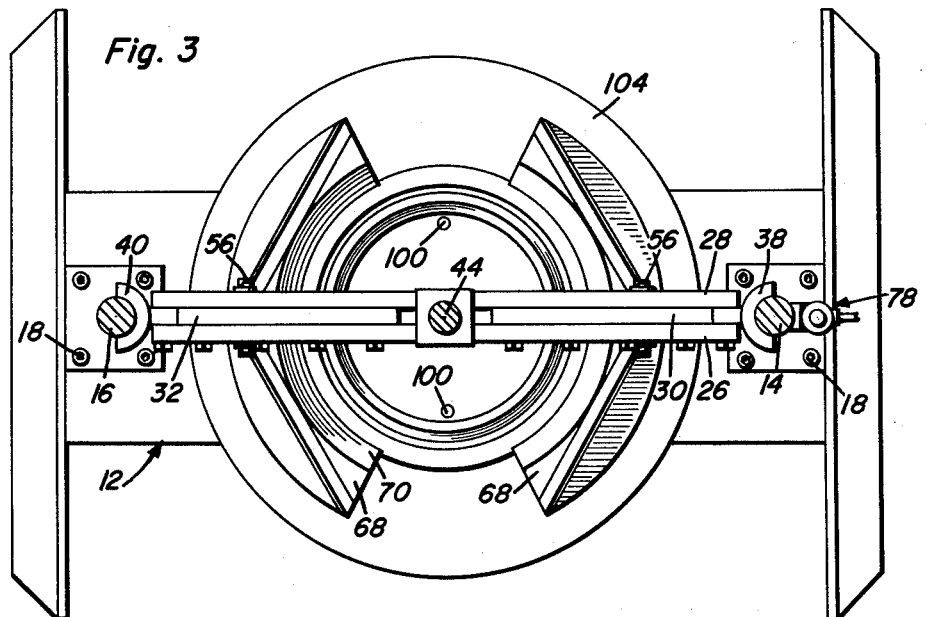
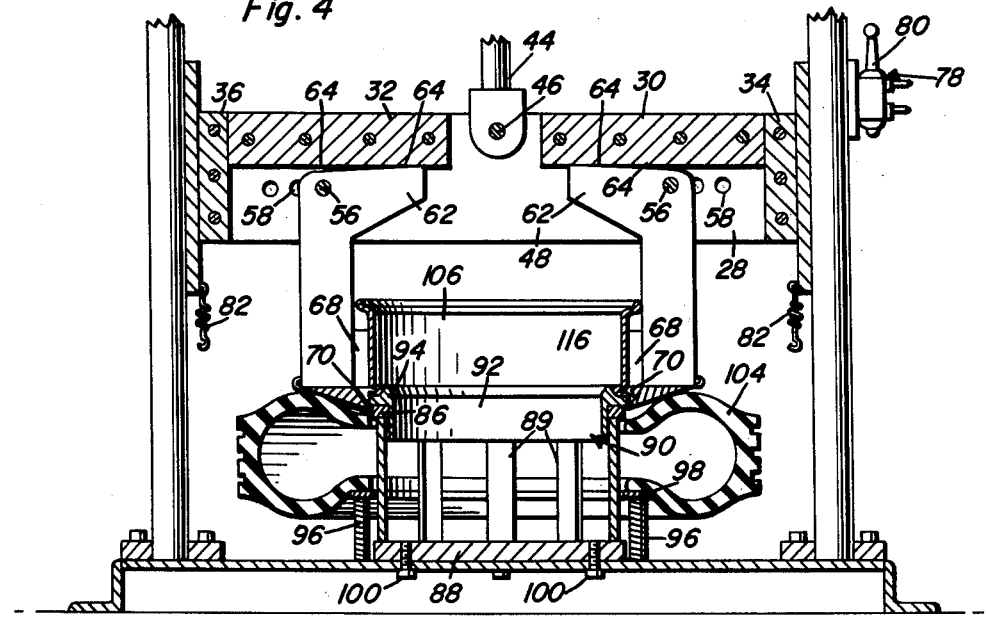

United States Patent Office 3,156,289
Patented Nov. 10, 1964

3,156,289
TIRE CHANGING MACHINE
Leland L. Dragoo, 1013 N. 9th, Beatrice, Nebr., and
Paul W. Goebel, R.F.D., Fairbury, Nebr.
Filed May 11, 1962, Ser. No. 193,930
5 Claims. (Cl. 157—1.2)

This invention relates to a novel and useful tire changing machine and has been designed primarily for the purpose of providing a machine adapted to assist in the removal of a tire casing from and its mounting on a wheel rim of the type including a removable lock ring.

Because of the difficulty in handling heavy duty tire casings of the type having relatively high side wall ply ratings, heavy duty tire casings are ordinarily mounted upon wheel rims of the type including one integral tire seating flange and a removable tire seating flange which may be in the form of a split lock ring.

It is relatively easy to mount a tire casing on a wheel rim of the type including a removable retaining flange and also relatively easy to remove a tire casing from such a wheel rim after the retaining flange has been removed. However, due to the fact that the same retaining flanges relay upon the normal tendency of the tire casing to expand for locking the removable flange to the corresponding side of its wheel rim, it is difficult to remove the flange or to replace the latter once a tire casing has been placed on a wheel rim on which the flange has been subsequently mounted. In order to replace or remove a retaining flange, it is a necessity that the corresponding side wall of the tire casing be inwardly deflected along its bead portion throughout its entire circumference so that the side pressure of that side wall will be removed from the retaining flange enabling it to be removed or replaced as desired.

While it is possible for a skilled person to remove and replace retaining flange even of the split ring type with hand tools, the manual task of removing or replacing a split lock ring is time-consuming and can sometimes be at best frustrating.

It is accordingly the main object of this invention to provide a tire changing machine adapted to assist in the removal of a tire casing from and its mounting on a wheel rim of the type having a removable retaining flange by providing a means by which the machine will be capable of inwardly deflecting one side wall of the tire casing a sufficient amount to enable the task of removing or replacing the retaining flange to be readily accomplished by means of hand tools without having to contend with the normal tendency of the tire casing to expand outwardly.

A further object of this invention, in accordance with the preceding object, is to provide a tire changing machine which is readily adaptable for handling wheel rims of varying sizes.

Another object of this invention is to provide a tire changing machine which necessitates the presence of only one operator when assisting in the mounting or removal of a tire casing from a wheel rim.

A final object to be specifically enumerated herein is to provide a tire changing machine which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a vertical sectional view taken substantially upon the plane indicated by the section line 2—2 of FIGURE 1;

FIGURE 3 is a horizontal sectional view taken substantially upon the plane indicated by the section line 3—3 of FIGURE 1;

FIGURE 4 is a fragmentary longitudinal vertical sectional view of the tire changing machine shown being used to force a tire casing from engagement with a wheel rim;

FIGURE 6 is a perspective view of a rest defining adapter for supporting a wheel rim in position on the tire changing machine; and FIGURE 7 is a fragmentary longitudinal vertical sectional view showing the manner in which the pressure foot members may be utilized to inwardly deflect one side wall of a tire casing so as to urge the latter away from the removable split lock ring of a wheel rim.

Figure 1:
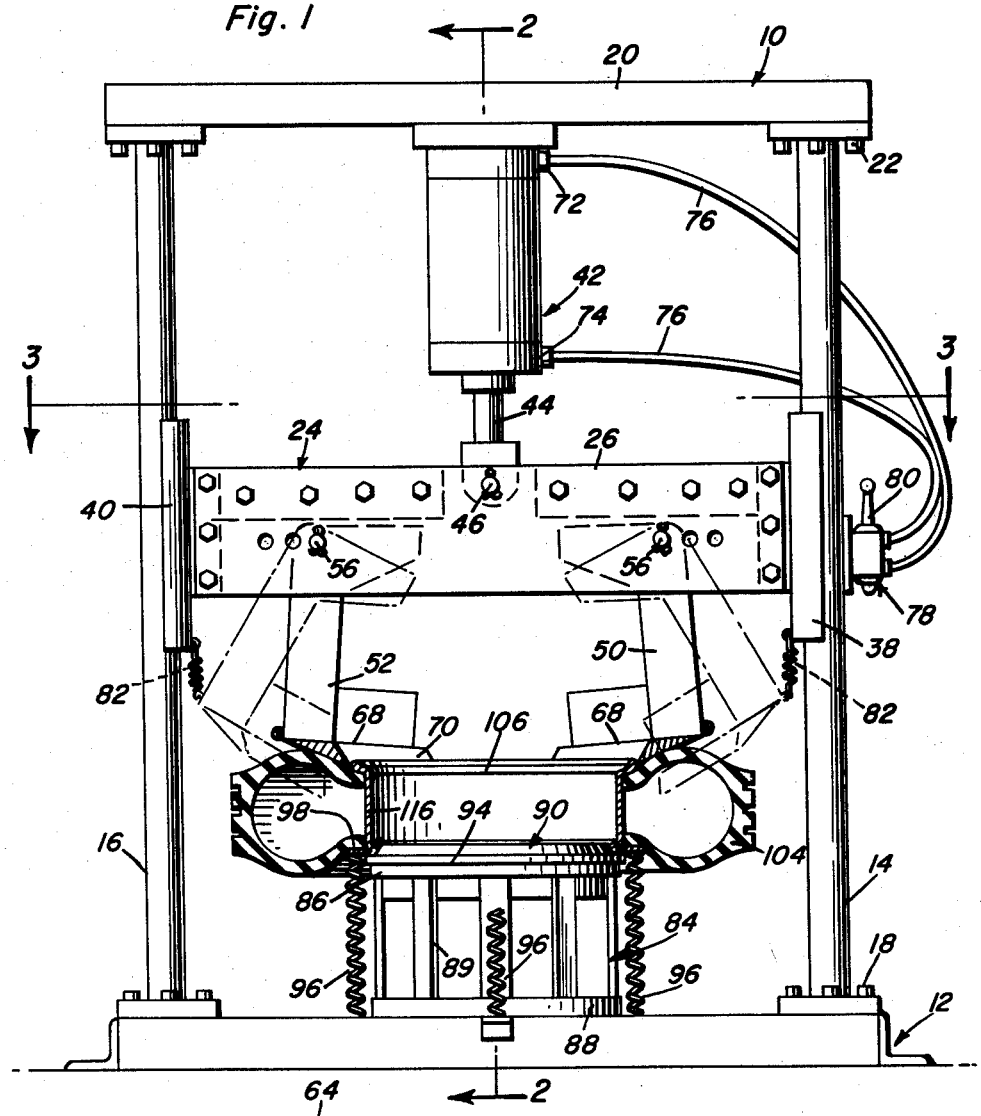
FIGURE 1 is a side elevational view of the tire changing machine shown with a wheel rim and tire casing mounted thereon, portions of the machine being shown in alternate positions by phantom lines and the tire casing and wheel rim being shown in vertical section.

Referring now more specifically to the drawings the numeral 10 generally designates the tire changing machine of the instant invention and it may be seen from FIGURES 1 through 3 of the drawings that the machine 10 includes a base generally referred to by the reference numeral 12. A pair of upright guide standards 14 and 16 are secured at their lower ends to the base 12 by means of fasteners 18 and have a cross beam 20 secured between their upper ends by means of fasteners 22. A pressure head assembly generally referred to by the reference numeral 24 extends longitudinally of the machine 10 between the upright standards 14 and 16 and comprises a pair of side plates 26 and 28 interconnected by means of a pair of filler plates 30 and 32 at their upper ends and at opposite ends by means of a pair of filler plates 34 and 36. A pair of generally semi-cylindrical guides 38 and 40 are secured to opposite ends of the pressure head 24 and slidably embracingly engage the confronting portions of the standards 14 and 16 thereby mounting the pressure head 24 for vertical movement toward and away from the base 12.

An extensible fluid motor generally referred to by the reference numeral 42 has its upper end secured to the crossbeam 20 in any convenient manner and the lower end of its piston rod 44 is secured to the pressure head 24 by means of a pivot pin 46.

The confronting surfaces of the side plates 26 and 28 disposed below the filler plates 30 and 32 and between the filler plates 34 and 36 define a downwardly opening pocket 48 in which the upper ends of a pair of depending pressure leg members 50 and 52 are pivotally secured by means of fasteners 56 passed through corresponding pairs of apertures 58 formed in the side plates 26 and 28 and a bore 60 formed in each pressure leg member 50, 52. Each pressure leg member 50 and 52 includes a laterally directed upper end portion 62 which includes an upper surface 64 whose end adjacent the free end of the corresponding upper end portion is adapted for engagement with the corresponding filler plate to limit inward swinging movement of the lower end of the corresponding pressure leg member toward the perpendicular centerline of the machine 10 which substantially coincides with the longitudinal axis of the piston rod 44.

Figure 5:
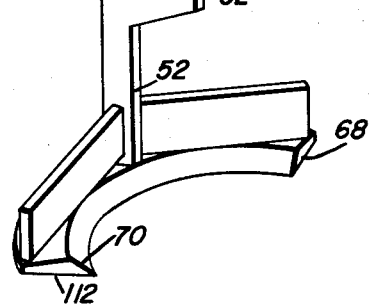
FIGURE 5 is a perspective view of one of the pressure leg members of the tire changing machine.

As can best be seen from FIGURE 5 of the drawings each of the pressure leg members 50 and 52 includes a generally arcuate pressure foot member 68 and it will be observed that the pressure foot members 68 open inwardly toward the perpendicular centerline of the machine 10 and toward each other. The inner peripheral edge portions of the pressure foot members 68 are bevelled as at 70 in order to enable the inner marginal edge portion of each pressure foot member to slip between the bead portion of the side wall which is being depressed thereby and the confronting retaining rim portion of the vehicle wheel rim on which the tire casing is disposed.

The fluid motor 42 includes a pair of inlet and outlet necks 72 and 74 which each have one end of a fluid pressure line 76 connected thereto. The opposite ends of the fluid pressure lines 76 are connected to a suitable control valve assembly generally referred to by the reference numeral 78. The control valve assembly 78 is of course to be connected to a suitable source of fluid under pressure and it includes a movable actuator 80 for selectively pressurizing and venting each of the fluid pressure lines 76 as desired to raise and lower the pressure head 24 by retraction and extension of the fluid motor 42.

An expansion spring 82 is secured at one end to each of the guides 38 and 40 and may be secured at the other end to the lower end of the corresponding pressure leg.

The base 12 includes means for supporting a vehicle wheel rim in a horizontally disposed position in the form of an upright standard generally referred to by the reference numeral 84. The standard 84 includes upper and lower ring portions 86 and 88 interconnected by means of brace members 89. An adapter ring generally referred to by the reference numeral 90 and defining a rest includes a cylindrical body portion 92 and an outwardly directed flange portion 94 which is adapted to overlie the upper ring portion 86 with the cylindrical portion 92 being received within the ring portion 86.

It is to be noted that the adapter 90 may have its flange portion 94 formed of any desired diameter so as to be readily adapted to support vehicle wheel rims of varying sizes.

A generally horizontally disposed support ring 98 for receiving a tire casing and supporting the latter as it is removed from a wheel rim is provided. The support ring 98 encircles the standard 84 and is supported from the base 12 by means of compression springs 96 secured between the base 12 and the support ring 98. The compression springs 96 are circumferentially spaced about the standard 84 and normally urge the support ring 98 to an uppermost position such as that shown in FIGURE 1 of the drawings. However, it may be observed from FIGURE 4 of the drawings that the support ring 98 may be urged downwardly relative to the adapter 90 to a position closely adjacent the base 12 during the removal of a tire casing from a wheel rim supported from the adapter 12. Thereafter, as soon as the wheel rim is removed, the support ring 98, with the casing supported concentrically thereon, will raise the casing above the lower end of the upper ring portion 86 in order that the casing may then be easily removed.

While it is not necessary, the standard 84 is secured to the base 12 by means of fasteners 100 secured to the lower ring portion 88 and it is to be understood that if an adapter having a larger flange portion than the flange portion 94 is utilized the uppermost position of the support ring 98 will be defined by the undersurface of that enlarged flange portion.

In operation, when it is desired to remove a tire casing from a vehicle wheel rim, the wheel rim with the tire casing mounted thereon is positioned on the adapter 90 with the split ring of the wheel rim disposed uppermost. Then, the pressure leg members 50 and 52 may be utilized to urge the uppermost side wall of the tire casing downwardly from engagement with the split lock ring. Thereafter, the split lock ring may be removed and the wheel rim can then be turned upside down and positioned on the adapter 90 as shown in FIGURE 1 of the drawings. Thereafter, the pressure leg members 50 and 52 may be again moved downwardly by means of the fluid motor 42 to urge the tire casing 104 from engagement with the wheel rim 106.

As can best be seen from FIGURE 7 of the drawings, when the foot members 68 are initially engaged with the tire casing 104 in order to force the uppermost side wall 108 away from the locking ring 110 the foot members 68 are swung outwardly slightly from their innermost limit positions. However, after the side wall 108 has been initially depressed, the bevelled undersurface 112 of the pressure foot members 68 will enable the latter to slip between the split lock ring 110 and the bead portion 114 of the side wall 108. Thereafter, the split ring 110 may be readily removed.

The pairs of aligned apertures 58 formed in the side plates 28 and 30 are strategically spaced along the length of the pressure head 24 so as to correspond to conventional sizes of wheel rims. The free ends of the upper surfaces 64 abut against the filler plates 30 and 32 to limit inward swinging movement of the pressure foot members 68 in order to prevent their inner peripheral edges from gouging the cylindrical portion 116 of the wheel rim 106. As some wheel rims are now being constructed of aluminum, they could be readily scarred if the inner peripheral edges of the pressure foot members 68 were allowed to come into engagement with the outer surfaces thereof. Accordingly, the upper surfaces 64 of the end portions 62 are designed to abut the filler plates 30 and 32 so as to limit inward swinging movement of the lower ends of the pressure legs 50 and 52 to positions which will closely embrace but which will be slightly spaced from the outer surfaces of the corresponding wheel rim 106.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tire changing machine adapted to assist in the removal of a tire casing from and its mounting on a wheel rim of the type including a split lock ring, said machine comprising a base defining an upstanding center axis and including support means adapted to support a wheel rim in an elevated horizontally disposed position, pressure head means, means mounting said pressure head means from said base above said support means for guided movement toward and away from said support means, motor means operatively connected between said base and said pressure head means for lowering said head means toward said base, depending pressure leg members carried by said pressure head means and including foot portions adapted to engage the upper side wall of a tire casing disposed on a wheel rim supported from said support means at points disposed circumferentially about said side wall for urging the latter downwardly upon the lowering of said pressure head means relative to said support means, said support means comprising an upright standard including means supported by the upper end portion thereof defining a rest on which a wheel rim may be supported in a horizontal position without said rest projecting outwardly beyond said rim, a horizontally disposed support ring, means mounting said ring from said base in concentric relation with said center axis and for movement between an upper position adjacent said rest and a lower position spaced below said rest, and means normally yieldably urging said ring toward said upper position, said ring being adapted to engage and support the lower side wall portion of a tire casing being forced downwardly by said pressure leg members from engagement with a wheel rim disposed on said rest.

2. The combination of claim 1 wherein said foot portions are each generally arcuate in plan shape and open toward said center axis and are adapted to at least partially closely embrace the upper periphery of a wheel rim disposed on said support means.

3. The combination of claim 1 wherein the upper ends of said pressure leg members are pivotally secured to said pressure head means for movement about generally horizontally disposed axes and for movement of the lower ends thereof toward and away from said center axis, said pressure leg members and said pressure head means including coacting means establishing limit positions for swinging movement of the lower ends of said pressure leg members toward said center axis, means connected between said leg members and said pressure head means normally resiliently urging swinging movement of said leg members away from said center axis.

4. The combination of claim 1 wherein said rest defining means is removably secured to the upper portion of said standard and is adapted to be replaced by similar means for supporting a wheel rim of a different size.

5. A tire changing machine adapted to assist in the removal of a tire casing from and its mounting on a wheel rim of the type including a split lock ring, said machine comprising a base defining an upstanding center axis and including support means adapted to support the wheel rim and its tire casing in an elevated horizontally disposed position, pressure head means, means supporting said pressure head means from said base and above said support means for guided movement toward and away from said support means, said pressure head means including means adapted to engage said tire casing at points spaced about its circumference, force means operatively connected between said base and said pressure head means for lowering said pressure head means toward said base for engagement with and urging said tire casing downwardly relative to said support means, said support means comprising an upright standard including means supported by the upper end portion thereof defining a rest on which a wheel rim may be supported in a horizontal position without said rest projecting outwardly beyond said rim, a horizontally disposed support ring, means mounting said ring from said base in concentric relation with said center axis and for movement between an upper position generally horizontally aligned with said rest and a lowered position spaced below said rest, and means operatively connected between said ring and said base normally yieldingly urging said ring toward said upper position, said ring being adapted to engage and to support the lower side wall portion of a tire casing being forced downwardly by said pressure head means from engagement with said wheel rim supported by said rest.

References Cited in the file of this patent

UNITED STATES PATENTS

| 1,708,439 | Booth | Apr. 9, 1929 |
| 2,375,956 | Smith et al. | May 15, 1945 |
| 2,423,652 | Kelley | July 8, 1947 |
| 2,436,003 | Gosselin | Feb. 17, 1948 |
| 2,442,714 | Stack | June 1, 1948 |
| 2,446,963 | Stolz | Aug. 10, 1948 |
| 2,566,315 | Christofoli et al. | Sept. 4, 1951 |
| 2,720,915 | Lenoir | Oct. 18, 1955 |
| 2,738,002 | King | Mar. 13, 1956 |

FOREIGN PATENTS

| 731,069 | Great Britain | June 1, 1955 |
| 67,436 | Netherlands | Feb. 15, 1951 |